(12) United States Patent
Bartley et al.

(10) Patent No.: US 6,330,875 B1
(45) Date of Patent: Dec. 18, 2001

(54) ENGINE WITH HYDRAULIC FUEL INJECTION AND ABS CIRCUIT USING A SINGLE HIGH PRESSURE PUMP

(75) Inventors: Bradley E. Bartley, Manito; James R. Blass, Bloomington; Dennis H. Gibson, Chillicothe, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/464,564

(22) Filed: Dec. 16, 1999

(51) Int. Cl.$^7$ .................................................... F02M 33/04
(52) U.S. Cl. ................................................................ 123/446
(58) Field of Search ................................... 123/446, 447, 123/495

(56) References Cited

U.S. PATENT DOCUMENTS

| | | |
|---|---|---|
| 3,675,422 | 7/1972 | Drutchas et al. . |
| 3,886,848 | 6/1975 | Budecker et al. . |
| 4,201,272 | 5/1980 | Midolo . |
| 4,603,919 | 8/1986 | Grauel et al. . |
| 4,682,824 | 7/1987 | Burgdorf et al. . |
| 4,824,182 | 4/1989 | Steffes et al. . |
| 5,168,703 | 12/1992 | Tobias . |
| 5,531,509 | 7/1996 | Kellner et al. . |
| 5,540,203 | 7/1996 | Foulkes et al. . |
| 5,894,830 | 4/1999 | Blass et al. . |
| 6,067,962 | 5/2000 | Bartley et al. . |
| 6,142,110 | 11/2000 | Bartley et al. . |
| 6,220,521 | 4/2001 | Bartley et al. . |

Primary Examiner—Thomas N. Moulis
(74) Attorney, Agent, or Firm—Eric M. Bram; Michael B. McNeil

(57) ABSTRACT

An engine system comprises a hydraulically actuated fuel injection system and an ABS circuit connected via a fluid flow passage that provides hydraulic fluid to both the fuel injection system and to the ABS circuit. The hydraulically actuated system includes a high pressure pump. The fluid control passage is in fluid communication with an outlet from the high pressure pump.

14 Claims, 2 Drawing Sheets

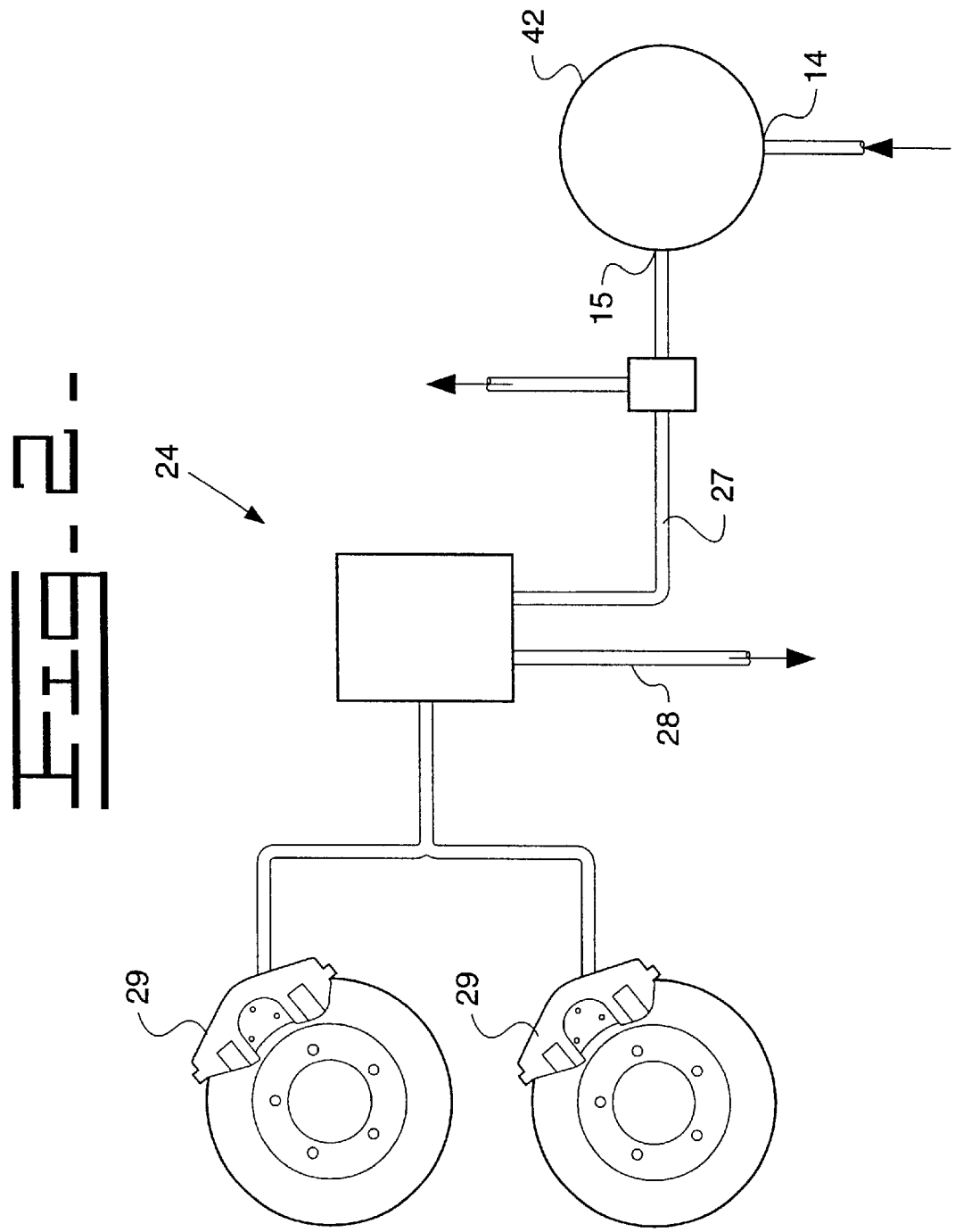

ENGINE WITH HYDRAULIC FUEL INJECTION AND ABS CIRCUIT USING A SINGLE HIGH PRESSURE PUMP

This invention was made with Government support under DOE contract No. DE-FC05-97OR22605 awarded by the United States Department of Energy. The Government has certain rights in this invention.

TECHNICAL FIELD

The invention relates generally to engines having both hydraulic fuel injection and an antilock braking systems (ABS), and more specifically to hydraulic fuel injection and an ABS circuit driven by a single hydraulic pump.

BACKGROUND

Antilock braking systems (ABS) utilize hydraulic pumps to provide the pulsating braking power that reduces the chances of a vehicle's wheels locking up and skidding uncontrollably during braking. Hydraulically actuated fuel injectors also utilize hydraulic pumps to provide hydraulic fluid to fuel injectors at sufficient pressure for use in actuating the fuel injectors.

Conventionally, ABS circuits utilize a hydraulic pump other than the hydraulic pump used for hydraulic actuation of the fuel injectors.

SUMMARY OF THE INVENTION

In one aspect of the invention, an engine system comprises a hydraulically actuated fuel injection system and an ABS circuit connected via a fluid flow passage that provides hydraulic fluid to both the fuel injection system and to the ABS circuit. The hydraulically actuated system includes a high pressure pump. The fluid flow passage is in fluid communication with an outlet from the high pressure pump.

In another aspect of the invention, a combined hydraulic and ABS booster comprises a high pressure pump having at least one outlet, an ABS circuit having a flow passage with one end fluidly connected to the at least one outlet, and a hydraulic circuit having a plurality of hydraulically actuated devices with inlets fluidly connected to the at least one outlet.

In yet another aspect of the invention, a combined hydraulically actuated fuel injection and ABS booster comprises a high pressure pump having an inlet fluidly connected to a source of fluid and at least one outlet, an ABS circuit having a flow passage fluidly connected to the at least one outlet, a high pressure common rail fluidly connected to the at least one outlet, and a plurality of hydraulically actuated fuel injectors fluidly connected to the common rail.

BRIEF DESCRIPTION OF THE DRAWINGS

FIG. 2 is a schematic view of an integrated hydraulically-actuated fuel injection and ABS circuit system configuration according to the invention.

BEST MODE FOR CARRYING OUT THE INVENTION

Figure 1:
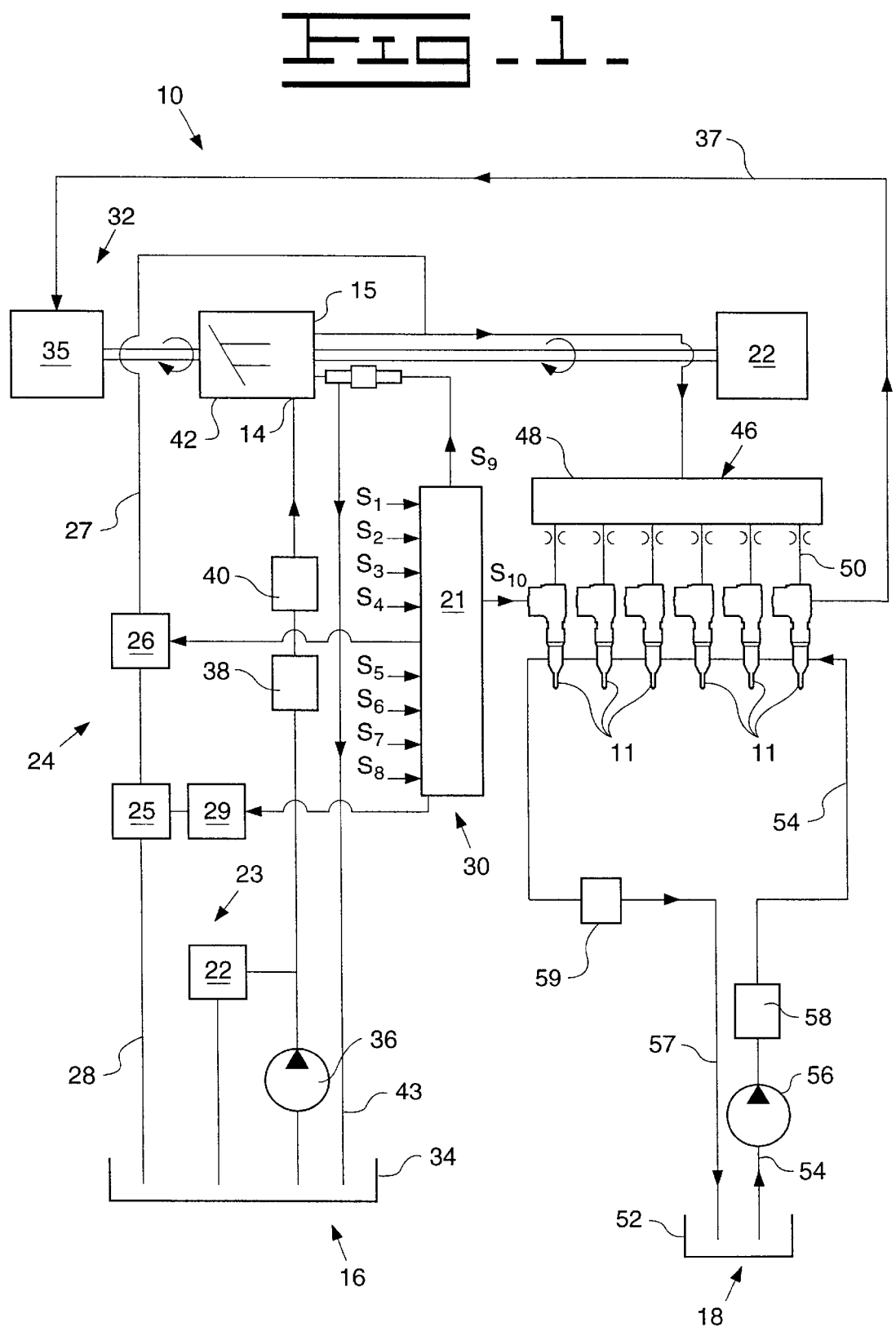
FIG. 1 is a diagrammatic representation of a hydraulically-actuated fuel injection and ABS circuit with integrated hydraulic pump according to the invention.

FIGS. 1 and 2 are diagrammatic representations of an ABS circuit 24 used with a hydraulically actuated fuel injection system 10 as adapted for a direct injection diesel cycle internal combustion engine 22. The fuel injection system 10 includes one or more fuel injectors 11, all of which are adapted to be positioned in a respective cylinder head bore of engine 22.

The fuel injection system 10 includes a source of actuation fluid 16 that supplies actuation fluid to each fuel injector 11, as well as to an engine lubricating circuit 23 and an ABS circuit 24. While any available engine fluid could be used as the actuation fluid in this system, the invention preferably utilizes engine lubricating oil. This allows fuel injection system 10 to be connected directly to engine lubricating circuit 23.

The fuel injection system 10 also includes a source of fuel 18 for supplying fuel to each fuel injector 11. A means for recirculating actuation fluid 32 containing a hydraulic fluid booster 35 is included in fuel injection system 10. The means for recirculating actuation fluid 32 is capable of recovering energy from the actuation fluid leaving each of the fuel injectors 11. A computer 30 may also be included in fuel injection system 10 to control timing and duration of injection events.

The source of actuation fluid 16 preferably includes an actuation fluid pan 34, an actuation fluid cooler 38, one or more actuation fluid filters 40 and a low pressure pump 36 for supplying oil or actuation fluid to both engine lubricating circuit 23 and fuel injection system 10. The source of actuation fluid 16 also preferably includes high pressure pump 42 for generating high pressure in the actuation fluid and at least one high pressure manifold 46.

High pressure pump 42 includes an inlet 14 connected to an outlet of low pressure pump 36, and an outlet 15. Both ABS circuit 24 and high pressure manifold 46 are connected to outlet 15. The location of ABS circuit 24 as related to high pressure manifold 46 is a matter of design choice. For instance, ABS circuit 24 could be connected to high pressure manifold 46 at a downstream location instead of in the manner shown in the drawing.

A rail branch passage 50 connects a high pressure actuation fluid inlet of each fuel injector 11 to high pressure common rail 48. Actuation fluid exiting fuel injector 11 flows through a low pressure actuation fluid drain that is connected to the means for recirculating actuation fluid 32 via a recirculation passage 37. A portion of the recirculated actuation fluid is channeled to high pressure pump 42 and another portion is returned to actuation fluid pan 34 via a recirculation line 43 and recirculated by low pressure pump 36.

Actuation fluid is delivered to ABS circuit 24 by high pressure pump 42 via a flow passage 27 that branches from high pressure pump 42. ADS circuit 24 preferably includes a flow regulating valve 26, an ABS booster 25, and a hydraulic fluid return passage 28. Actuation fluid can flow into ABS circuit 24 through outlet 15 via flow passage 27. Actuation fluid is channeled through flow passage 27 to flow regulating valve 26.

The flow regulating valve 26 may be required when it is desirable for ABS booster 25 to receive hydraulic fluid at a different pressure than fuel injection system 10. The flow regulating valve 26 passes hydraulic fluid to the ABS booster 25, which supplies the hydraulic fluid as high pressure brake fluid to vehicle brakes 29. Actuation fluid is returned to the hydraulic fluid source 16 via actuation fluid return passage 28.

The source of fuel 18 preferably includes a fuel supply regulating valve 59 and a fuel circulation and return passage 57 arranged in fluid communication between fuel injectors 11 and fuel tank 52. Fuel is supplied to fuel injectors 11 via a fuel supply passage 54 arranged in fluid communication between fuel tank 52 and the fuel inlet of each fuel injector 11. Fuel being supplied through fuel supply passage 54 travels through a low pressure fuel transfer pump 56 and one or more fuel filters 58.

Fuel injection system 10 is electronically controlled via computer 30 that includes an electronic control module 21 that controls the timing and duration of injection events and pressure in high pressure manifold 46. Based upon a variety of input parameters including temperature, throttle, engine load, etc. (S1–S8) electronic control module 21 can determine a desired injection timing duration and manifold pressure to produce some desired performance at the sensed operating conditions. The electronic control module 21 can also be used if desired to control the flow regulating valve 26 included in the ABS circuit 24, as well as the brakes 29.

INDUSTRIAL APPLICABILITY

A typical actuation fluid used by the invention is engine lubricating oil. Actuation fluid pumped by low pressure pump 36 is directed through engine lubricating circuit 23. After this actuation fluid has performed work in engine lubricating circuit 23 it flows back into actuation fluid pan 34 where it will be recirculated. A portion of oil pumped by low pressure pump 36 is channeled to high pressure pump 42 rather than to engine lubricating circuit 23.

Actuation fluid pumped by high pressure pump 42 is directed to both ABS circuit 24 and high pressure manifold 46. A first amount of actuation fluid exits high pressure pump 42 through outlet 15 and flows into ABS circuit 24 via flow passage 27 and through flow regulating valve 26. This first amount of actuation fluid is returned via actuation fluid return passage 28 for recirculation upon exiting the ABS booster 25. A second amount of actuation fluid exits high pressure pump 42 through outlet 15 and flows to high pressure manifold 46. The actuation fluid flows into fuel injectors 11 via a series of rail branch passages 50 from high pressure manifold 46. After performing work in fuel injectors 11, actuation fluid flows through recirculation passage 37 to actuation fluid pan 34 for recirculation.

Utilizing the existing hydraulic actuation power of the hydraulically actuated fuel injection system in this way, the separate pump needed to operate the ABS can be eliminated.

It should be understood that the above description is intended only to illustrate the concepts of the invention, and is not intended to in any way limit the potential scope of the invention. For instance, while the present system utilizes engine lubricating oil as actuation fluid to allow the hydraulic system and ABS circuit to be directly connected to the engine lubricating system, it should be appreciated that the actuation fluid could be supplied from a separate source and the engine lubricating system could be made separate. Thus, various modifications could be made without departing from the intended spirit and scope of the invention as defined by the claims below.

What is claimed is:

1. An engine system comprising:
    a hydraulically actuated fuel injection system and an ABS circuit connected via a fluid flow passage that provides hydraulic fluid to both the fuel injection system and to the ABS circuit;
    an engine lubrication system in fluid communication with the fuel injection system and the ABS circuit;
    the hydraulically actuated system including a high pressure pump; and
    the fluid flow passage in fluid communication with an outlet from the high pressure pump.

2. The engine system of claim 1 wherein the ABS circuit includes a flow regulating valve.

3. The engine system of claim 1, further including an actuation fluid pan fluidly connected to an inlet of the high pressure pump.

4. The engine system of claim 1, wherein:
    the hydraulically actuated system includes a high pressure common rail and a plurality of hydraulically actuated fuel injectors, a pressure control device is attached to the common rail; and
    an electronic control module is attached to the engine housing, and is in communication with, and capable of controlling, the pressure control device and the hydraulically actuated devices.

5. The engine system of claim 4, wherein the electronic control module is further capable of controlling at least one of a flow regulating valve and vehicle brakes.

6. A combined hydraulic and ABS booster system comprising:
    a high pressure pump having at least one outlet;
    an ABS circuit having a flow passage with one end fluidly connected to the at least one outlet;
    a hydraulic circuit having a plurality of hydraulically actuated devices with inlets fluidly connected to the at least one outlet; and
    an engine lubrication system in fluid communication with the hydraulic circuit and the ABS circuit.

7. The system of claim 6 further comprising an electronic control module in communication with and being capable of controlling the hydraulically actuated devices.

8. The system of claim 6 wherein the high pressure pump includes an inlet connected to a source of engine lubricating oil.

9. The system of claim 6 wherein the ABS booster passage further includes a flow passage fluidly connected to a fluid reservoir;
    the hydraulic devices having outlets fluidly connected to the fluid reservoir; and
    the high pressure pump having an inlet fluidly connected to the fluid reservoir.

10. A hydraulic system comprising:
    an engine lubrication subsystem;
    a hydraulically actuated fuel injection subsystem fluidly connected to said engine lubrication subsystem; and
    an ABS subsystem fluidly connected to said fuel injection subsystem and said engine lubrication subsystem.

11. The hydraulic system of claim 10 including a low pressure pump and a high pressure pump.

12. The hydraulic system of claim 11 including a flow regulating valve fluidly positioned between said fuel injection subsystem and said ABS subsystem.

13. The hydraulic system of claim 12 wherein inlet of said high pressure pump is fluidly connected to outlet of said low pressure pump.

14. The hydraulic system of claim 13 wherein an inlet of said low pressure pump is fluidly connected to an oil pan.

* * * * *